United States Patent Office 3,632,584
Patented Jan. 4, 1972

3,632,584
PYRIMIDINE DERIVATIVES
Klaus Gutsche, Berlin, Germany, and Mahmud Muftic, Cornavin-Geneva, Switzerland, assignors to Schering A.G., Berlin, Germany
No Drawing. Filed June 24, 1968, Ser. No. 739,171
Claims priority, application Germany, June 23, 1967, Sch 40,920
Int. Cl. C07d 51/36
U.S. Cl. 260—251          15 Claims

ABSTRACT OF THE DISCLOSURE

For combatting bacteria, and trichomonads such as *Trichomonas vaginalis*, drugs of the following formula:

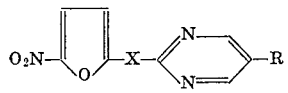

wherein
R represents substituted and unsubstituted aliphatic, aryl or aralkyl residues;
X represents —CH=CY—, and
Y represents hydrogen, lower alkyl, aryl or aralkyl.

BACKGROUND OF THE INVENTION

This invention relates to derivatives of pyrimidine substituted at the 2-position by 5-nitrofuryl-2, and in particular to such derivatives wherein the pyrimidine ring is additionally substituted at the 5-position.

There is a need for drugs which are effective against a variety of microbes such as bacteria and trichomonads, and which are especially efficacious for the treatment of infections caused by *Trichomonas vaginalis*.

SUMMARY OF THE INVENTION

An object of this invention is to provide pharmaceutical compositions and methods of administration especially applicable to the treatment of such diseases wherein gram positive bacteria, gram negative bacteria and/or trichomonads are the causative factors.

Another object of this invention is to provide novel chemical compounds as well as processes and intermediates for their preparation.

Upon further study of the specification and appended claims, other objects and advantages of the present invention will become apparent.

To attain the objects of this invention, there are provided compounds of the following formula:

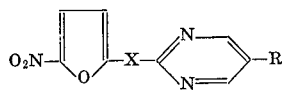

wherein
R represents aliphatic; aliphatic-oxy; hydrocarbon aryl; hydrocarbon aralkyl; cycloaliphatic-oxy or heterocyclic aryl.
X represents a direct bond, or —CH=CY—wherein Y represents hydrogen, alkyl, aryl or aralkyl.

DETAILED DISCUSSION OF THE INVENTION

Respecting the definition of R in the above formula:
When R represents aliphatic, it is preferably alkyl or alkoxy of 1-6 carbon atoms. However, the alkyl or alkoxy can also be optionally substituted, preferably in the ω-position by one or more of alkoxy groups of preferably 1-4 carbon atoms, hydroxy, hydrocarbon acyloxy of 1-10 carbon atoms, or halo such as chloro. Aliphatic examples of R include, but are not limited to, methyl, propyl, hexyl, methoxy, propoxy, hexyloxy, methoxyethoxy, acetoxyethoxy, hydroxyethoxy, acetoxypropyl, hydroxypropyl, chlorethoxy, ethyl, butyl, ethoxy, butoxy, amyl, amyloxy, ethoxy-ethoxy.

When R represents hydrocarbon aryl, it contains preferably 6 to 10 carbon atoms. Aryl can also be optionally substituted by at least one of halo (especially chloro), nitro, amino, alkyl or alkoxy of 1–4 carbon atoms. Examples of aryl include, but are not limited to, phenyl.

When R is hydrocarbon aralkyl, it contains preferably 8 to 12 carbon atoms and can be optionally substituted by the same moieties as indicated above for hydrocarbon aryl. Examples of aralkyl include, but are not limited to, cyclohexyl.

When R is cycloaliphatic-oxy, it contains preferably 5 to 7 carbon atoms, and can be optionally substituted by the same moieties indicated above for hydrocarbon aryl. Examples of cycloaliphatic-oxy include, but are not limited to, cyclohexyloxy.

When R is heterocyclic aryl, it contains preferably 4 to 5 carbon atoms and one hetero atom such as N, S and O. In addition, it can be optionally substituted by the same moieties indicated above for hydrocarbon aryl. Examples of heterocyclic aryl include, but are not limited to, pyridyl.

In connection with the definition of X, it is preferably a monovalent carbon to carbon bond, thereby setting forth a preferred subgeneric group of compounds.

When X represents —CH₂=CHY—, Y is preferably hydrogen. When Y is other than hydrogen, it can represent lower alkyl such as methyl, ethyl, etc.; aryl, preferably hydrocarbon aryl of 6 to 10 carbon atoms, such as phenyl; or aralkyl, preferably hydrocarbon aralkyl of 7 to 12 carbon atoms, such as benzyl.

To produce the above compounds, the following processes can be employed:
(a) When X represents a direct bond between the rings, 5-nitro-2-amidinofuran is condensed under ring closure with a β-dialkylaminoacrolein derivative of the following Formula I:

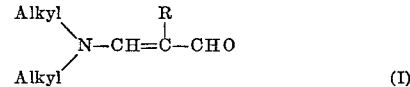

wherein
R has the previously indicated meanings. Alternatively, 2-amidinofuran can be condensed under ring closure with a β-dialkylaminoacrolein derivative of the general Formula I; the nitro group is subsequently introduced.

(b) When X represents the group —CH=CY—, nitrofurfural or the functional derivatives thereof are condensed with a compound of the following Formula II:

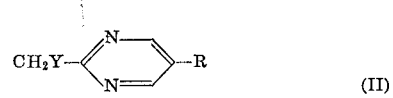

wherein
Y and R have the previously indicated meanings. Alternatively, furfural or a functional derivative thereof is condensed with a compound of Formula II, and then the nitro group is introduced, followed by the optional steps of esterifying a hydroxy group; or exchanging a halogen atom for the hydroxy group; or saponifying an acyloxy group of 1–10 carbon atoms.

The condensation of an amidinofuran derivative with a β-dialkylaminoacrolein of Formula I is usually accomplished with good yields. The reaction can be conducted in a polar solvent, such as, for example, water, alcohol, dimethyl formamide, and by the addition of a base, the reaction can be accelerated. Since the free amidinofurans are not very stable, it is normally customary to employ salts of the amidinofuran as the starting material.

The condensation of 5-nitrofurfural or a functional derivative thereof with a compound of Formula I is accomplished at an elevated temperature, e.g. 50 to 200° C. and in the presence of a condensing agent, such as, e.g. glacial acetic acid, with an addition of sulfuric acid, acetic anhydride or phosphoric acid. Examples of functional derivatives of nitrofurfural include, but are not limited to, acetals and, in particular, the diacetate.

The introduction of the nitro group subsequent to the condensation reaction can be conducted in accordance with conventional methods. Thus, it is possible, for example, to introduce the $NO_2$ group by means of a nitrating acid mixture, e.g. fuming nitric. However, in some cases, it is recommended to employ 5-nitrofuran derivatives themselves as starting materials in the condensation reaction if a subsequent nitration would lead to hydrolytic side reactions. Free hydroxy groups are suitably blocked before the nitration step, for example, by esterification, in order to avoid undesired side reactions.

The novel compounds, particularly those wherein X represents a direct bond between the two rings, are highly effective against gram-positive and gram-negative bacteria, and are quite effective against trichomonads. Table I shows the latter effect on *Trichomonas vaginalis*, the compounds being used for comparison are N-[5-nitrofurfurylidene-(2)]-1-aminohydantoin (U.S. Pat. No. 2,610,181) and N-[5-nitrofurfurylidene-(2)]-3-amino-oxazolidone-(2) (U.S. Patent No. 2,759,931), and the test being in vitro and conducted according to the well-known serial dilution test in liquid medium containing 10% horse serum.

In DAS (German published application) No. 1,236,511, there are described compounds similar with respect to chemical structure and effectiveness. However, the compounds of the present invention yield a higher therapeutic index than the conventional compounds due to their lower toxicity, as can be seen from Table II. Thus the compounds of this invention can be administered in vivo as well as in vitro.

The compounds of this invention can be employed as disinfectants, e.g. in the sterilization of medical instruments and the like, as well as in cleansing solutions for cleaning woodwork, towels, linen, blankets, dishes and the like, to prevent spread of infection.

The novel compounds of this invention can be employed in mixture with conventional pharmaceutical excipients. Carrier substances can be such organic or inorganic substances suitable for parenteral, enteral, or topical application, and which, of course, do not deleteriously react with the novel compounds, such as, for example, water, vegetable oils, polyethylene glycols, gelatin, lactose, amylose, magnesium stearate, talc, vaseline, cholesterol, etc.

For parenteral application, particularly suitable are solutions, preferably oily or aqueous solutions, as well as suspensions, emulsions or implants. Ampoules are convenient unit dosages.

For enteral application, particularly suitable are tablets or dragees which are also characterized by talc and/or a carbohydrate carrier or binder or the like, the carbohydrate carrier being preferably lactose and/or corn starch and/or potato starch. A syrup or the like can also be used wherein a sweetened vehicle is employed.

For topical application, viscous to semi-solid forms are used such as liniments, salves, or creams, which are, if desired, sterilized, or mixed with auxiliary agents, such as preservatives, stabilizers, or wetting agents, or salts for influencing the osmotic pressure, or with buffer substances.

The substances of this invention are generally administered to animals, including, but not limited to, mammals and avians, e.g. cattle, cats, dogs, and poultry. The compounds are administered orally in a preferred dosage range of 5 to 10 mg. per day per kg. of body weight. It is as well possible to give these compounds topically for instance as vaginal tablets. Preferably a unit dosage usually contains 100 to 500 mg. and 1–5000 mg. of pharmaceutically acceptable carrier, and such units are generally administered in a single daily dose, but can be alternatively administered in divided doses.

The previously referred to tables are as follows:

TABLE I

| Compound | Minimum total inhibitory dosage in γ/ml. against *Trichomonas vaginalis* |
|---|---|
| 2-(5-Nitrofuryl-2)-5-methoxypyrimidine | 0.32 |
| 2-(5-Nitrofuryl-2)-5-ethoxypyrimidine | <2.5 |
| 2-(5-Nitrofuryl-2)-5-methoxyethoxypyrimidine | <2.5 |
| 2-(5-Nitrofuryl-2)-5-phenylpyrimidine | 1 |
| 2-(5-Nitrofuryl-2)-5-(4-pyridyl)-pyrimidine | 1 |
| 2-(5-Nitrofuryl-2)-5-methylpyrimidine | <2.5 |
| 2-(5-Nitrofuryl-2)-5-n-butoxypyrimidine | <3.2 |
| 2-(5-Nitrofuryl-2)-5-γ-hydroxypropylpyrimidine | <1 |
| 2-(5-Nitrofuryl-2)-5-γ-acetoxypropylpyrimidine | <2.5 |
| 2-(5-Nitrofuryl-2)-5-β-acetoxyethoxypyrimidine | <0.25 |
| 2-(5-Nitrofuryl-2)-5-isoamyloxypyrimidine | <2.5 |
| 2-(5-Nitrofuryl-2)-5-β-chloroethoxypyrimidine | <1 |
| N-[5-Nitrofurfurylidene-(2)]-1-amino-hydantoin (Comparison Compound) | 30 |
| N-[5-Nitrofurfurylidene-(2)]-3-amino-oxazolidone-(2) (Comparison Compound) | 10 |

TABLE II

| Compound: | $LD_{50}$ p.o. (orally) in mice in g./kg. |
|---|---|
| 2-(β-[5-Nitrofuryl-(2)]-vinyl)-pyrimidine (DAS 1,236,511) | 1 |
| N-[5-Nitrofurfurylidene-(2)]-1-amino-hydantoin | 0.8 |
| N-[5-Nitrofurfurylidene-(2)]-3-amino-oxazolidone-(2) | 1.76 |
| 2-(5-Nitrofuryl-2)-5-methoxypyrimidine | >4 |
| 2-(5-Nitrofuryl-2)-5-ethoxypyrimidine | >4 |
| 2-(5-Nitrofuryl-2)-5-methoxyethoxypyrimidine | >4 |
| 2-(5-Nitrofuryl-2)-5-n-butoxypyrimidine | >4 |

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Example 1

24.2 g. of sodium is dissolved in 250 ml. of methanol. Thereafter, 73.5 g. of α-methoxy-β-dimethylaminoacrolein and 76.5 g. of 2-amidinofuran hydrochloride are added thereto. The mixture is boiled under reflux for about 10 hours; then, the methanol is distilled off and the residue is mixed with water. The thus-obtained precipitate is vacuum-filtered and, after drying by air, recrystallized from petroleum ether, thus obtaining approximately 60 g. of 2-(furyl-2)-5-methoxypyrimidine, M.P. 105–106° C. 29 g. of this compound is dissolved in 200 ml. of concentrated sulfuric acid at 0° C. and nitrated under cooling at 0–5° C. with a mixture of 40 ml. of concentrated sulfuric acid and 19.5 ml. of concentrated nitric acid (density: 1.48). After all of the nitrating acid has been added dropwise, the reaction mixture is stirred for ½ hour at 0–5° C. Thereafter, the solution is poured on ice, and the thus-produced precipitate is vacuum-filtered and recrystallized from alcohol.

Approximately 30 g. of 2-(5-nitrofuryl-2)-5-methoxypyrimidine, M.P. 206–207° C., is obtained.

Example 2

20 g. of 5-nitrofuramidine-2-hydrochloride and 17 g. of α-n-butoxy-β-dimethylaminoacrolein are boiled under reflux in 100 ml. of ethanol for 8 hours. Then, the ethanol is distilled off, and the residue is mixed with water. The thus-obtained precipitate is recrystallized several times with charcoal from ethanol.

15 g. of 2-(5-nitrofuryl-2)-5-n-butoxypyrimidine is obtained, M.P. 135–136° C.

Example 3

24.3 g. of nitrofurfural diacetate and 12.4 g. of 2-methyl-5-methoxypyrimidine (produced from acetamide and α-methoxy-β-dimethylaminoacrolein, B.P.$_{12}$ 85–90° C.) are heated in 50 ml. acetic anhydride for 18 hours to 100° C. Thereafter, the acetic anhydride is distilled off, and the residue is recrystallized from alcohol, thus producing about 15 g. of 2-(β-[5-nitrofuryl-2]-vinyl)-5-methoxypyrimidine, M.P. 178° C.

Example 4

Analogously to Example 1, 2-(5-nitrofuryl-2)-5-ethoxypyrimidine, M.P. 179° C., is obtained from furamidine and α-ethoxy-β-dimethylaminoacrolein.

Example 5

Analogously to Example 1, 2-(5-nitrofuryl-2)-5-(β-methoxyethoxy)-pyrimidine, M.P. 155° C., is produced from furamidine and α-methoxyethoxy-β-dimethylaminoacrolein.

Example 6

Analogously to Example 1, 2-(5-nitrofuryl-2)-5-n-propoxypyrimidine, M.P. 106° C., is obtained from furamidine and α-n-propoxy-β-dimethylaminoacrolein.

Example 7

Analogously to Example 1, 2-(5-nitrofuryl-2)-5-phenylpyrimidine, M.P. 225° C., is produced from furamidine and α-phenyl-β-dimethylaminoacrolein.

Example 8

Analogously to Example 1, 2-(5-nitrofuryl-2)-5-isoamyloxypyrimidine, M.P. 150° C., is obtained from furamidine and α-isoamyloxy-β-dimethylaminoacrolein.

Example 9

Analogously to Example 1, 2-(5-nitrofuryl-2)-5-methylpyrimidine, M.P. 220° C., is prepared from furamidine and α-methyl-β-dimethylaminoacrolein.

Example 10

Analogously to Example 1, 2-(5-nitrofuryl-2)-5-ethylpyrimidine, M.P. 153° C., is produced from furamidine and α-ethyl-β-dimethylaminoacrolein.

Example 11

Analogously to Example 1, 2-(5-nitrofuryl-2)-5-cyclohexyloxypyrimidine, M.P. 226° C., is prepared from furamidine and α-cyclohexyloxy-β-dimethylaminoacrolein.

Example 12

Analogously to Example 1, 2-(5-nitrofuryl-2)-5-(4-pyridyl)-pyrimidine, M.P. 252° C., is obtained from furamidine and α-(4-pyridyl)-β-dimethylaminoacrolein.

Example 13

Analogously to Example 1, 2-(5-nitrofuryl-2)-5-isobutylpyrimidine, M.P. 137° C., is produced from furamidine and α-isobutyl-β-dimethylaminoacrolein.

Example 14

Analogously to Example 1, 2-(5-nitrofuryl-2)-5-isopropylpyrimidine, M.P. 168° C., is prepared from furamidine and α-isopropyl-β-dimethylaminoacrolein.

Example 15

30 g. of 2-(furyl-2)-5-β-acetoxyethoxypyrimidine (melting point 109° C.) is dissolved in 100 ml. of acetic anhydride, and mixed under agitation at 0–5° C. with 15 ml. of concentrated nitric acid (density: 1.48). The reaction mixture is stirred for another ½ hour; then, the acetic anhydride is decomposed with 300 ml. of H$_2$O. The precipitate is vacuum-filtered, washed with water, and recrystallized from alcohol, thus obtaining 25 g. of 2-(5-nitrofuryl-2)-5-β-acetoxyethoxypyrimidine, M.P. 157° C.

Example 16

By boiling the last-mentioned compound [2-(5-nitrofuryl-2)-5-β-acetoxyethoxypyrimidine] for one hour with semiconcentrated hydrochloric acid, 2-(5-nitrofuryl-2)-5-β-hydroxyethoxypyrimidine is produced, having the melting point of 156–158° C.

Example 17

Analogously to Example 15, 2-(5-nitrofuryl-2)-5-γ-acetoxypropylpyrimidine, M.P. 102–103° C., is produced from 2-(furyl-2)-5-γ-acetoxypropylpyrimidine (M.P. 70° C.) by nitration; by saponifying this reaction product, 2-(5-nitrofuryl-2)-5-γ-hydroxypropylpyrimidine, M.P. 134° C., is obtained.

Example 18

30 g. of 2-(furyl-2)-5-β-chloroethoxypyrimidine (M.P. 91–93° C.) is dissolved in 200 ml. of concentrated H$_2$SO$_4$ and mixed at 0–5° C. with 20 ml. of concentrated nitric acid. The reaction mixture is stirred for ½ hour, then poured on ice, and the precipitate is vacuum-filtered. After recrystallization from ethanol, 25 g. of 2-(5-nitrofuryl-2)-5-β-chloroethoxypyrimidine, M.P. 154° C., is obtained.

Example 19

200.0 g. of 2-(5-nitrofuryl-2)-5-methoxypyrimidine, 105.3 g. of corn starch, 8.0 g. of gelatin, white, 6.5 g. of talc, 0.112 g. of the methyl ester of p-hydroxybenzoic acid, and 0.048 g. of the propyl ester of p-hydroxybenzoic acid are homogeneously mixed and compressed into tablets of 320 mg. each on a tabletting machine in a conventional manner.

Example 20

2.0 g. of 2-(5-nitrofuryl-2)-5-methoxyethoxypyrimidine, 27.0 g. of lactose, 45.5 g. of corn starch, 4.0 g. talc, 1.4 g. of gelatine, white, 0.024 g. of the methyl ester of p-hydroxybenzoic acid, and 0.011 g. of the propyl ester of p-hydroxybenzoic acid are homogeneously mixed and compressed into tablets of 40 mg. each on a tabletting machine in a conventional manner.

Example 21

10.0 g. of 2-(5-nitrofuryl-2)-5-n-butoxypyrimidine, 60.0 g. of lactose, 4.9 g. of corn starch, 800 mg. of magnesium stearate, 8 mg. of the methyl ester of p-hydroxybenzoic acid and 3.5 mg. of the propyl ester of p-hydroxybenzoic acid are homogenously mixed and compressed into vaginal tablets of about 750 mg. in a conventional manner.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:
1. A compound of the formula

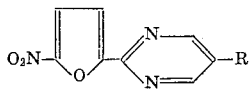

wherein R is (a) alkoxy or 1–6 carbon atoms optionally substituted by alkoxy, hydroxy, alkanoyloxy of 1–10 carbon atoms or halo; (b) phenyl; (c) cycloaliphatic-oxy of 5–7 carbon atoms; (d) pyridyl; or (b), (c), or (d) optionally substituted by halo, nitro, amino, alkyl or alkoxy of 1–4 carbon atoms.

2. A compound as defined by claim 1 wherein said compound is 2-(5-nitrofuryl-2)-5-methoxypyrimidine.
3. A compound as defined by claim 1 wherein said compound is 2-(5-nitrofuryl-2)-5-n-butoxypyrimidine.
4. A compound as defined by claim 1 wherein said compound is 2-(5-nitrofuryl-2)-5-ethoxypyrimidine.
5. A compound as defined by claim 1 wherein said compound is 2-(5-nitrofuryl-2) - 5-(β-methoxyethoxy)-pyrimidine.
6. A compound as defined by claim 1 wherein said compound is 2-(5-nitrofuryl-2)-5-n-propoxypyrimidine.
7. A compound as defined by claim 1 wherein said compound is 2-(5-nitrofuryl-2)-5-phenylpyrimidine.
8. A compound as defined by claim 1 wherein said compound is 2-(5-nitrofuryl-2)-5-cyclohexyloxypyrimidine.
9. A compound as defined by claim 1 wherein said compound is 2-(5-nitrofuryl-2)-5-(4-pyridyl)-pyrimidine.
10. A compound as defined by claim 1 wherein said compound is 2-(5-nitrofuryl-2)-5-isoamyloxypyrimidine.
11. A compound as defined by claim 1 wherein said compound is 2-(5-nitrofuryl-2)-5 - β-acetoxyethoxypyrimdine.
12. A compound as defined by claim 1 wherein said compound is 2-(5-nitrofuryl-2)-5 - β-hydroxyethoxypyrimidine.
13. A compound as defined by claim 1 wherein said compound is 2-(5-nitrofuryl-2)-5-β-chloroethoxypyrimidine.
14. A compound as defined by claim 1 wherein R is alkoxy of 1–6 carbon atoms optionally substituted by alkoxy of 1–4 carbon atoms, hydroxy, alkanoyloxy of 1–10 carbon atoms or halo.
15. A compound as defined by claim 1 wherein R is alkoxy of 1–6 carbon atoms.

References Cited

UNITED STATES PATENTS

| 3,096,332 | 7/1963 | Von Esch et al. | 260—251 |
| 3,359,262 | 12/1967 | Takamatsu et al. | 260—240 |

FOREIGN PATENTS

| 14,693 | 7/1964 | Japan | 260—240 |
| 13,877 | 7/1965 | Japan | 260—240 |

OTHER REFERENCES

Fujita et al., Chem. Pharm. Bull. vol. 13, pp. 1183, 1187–1188, 1190 and 1193 (1966).

JOHN D. RANDOLPH, Primary Examiner

U.S. Cl. X.R.

424—251; 260—240 A

UNITED STATES PATENT OFFICE
CERTIFICATE OF CORRECTION

Patent No. 3,632,584  Dated January 4, 1972

Inventor(s) Klaus Gutsche and Mahmud Muftic

It is certified that error appears in the above-identified patent and that said Letters Patent are hereby corrected as shown below:

COLUMN 5, line 12 - "acetamide" should read -- acetamidine --.

COLUMN 7, first line after the formula - "or" should read -- of --.

Signed and sealed this 13th day of March 1973.

(SEAL)
Attest:

EDWARD M. FLETCHER, JR.
Attesting Officer

ROBERT GOTTSCHALK
Commissioner of Patents